(12) United States Patent
Nakane

(10) Patent No.: US 9,619,740 B2
(45) Date of Patent: Apr. 11, 2017

(54) IMAGE PROCESSING APPARATUS AND IMAGE PROCESSING METHOD

(71) Applicant: CANON KABUSHIKI KAISHA, Tokyo (JP)

(72) Inventor: Hiroyuki Nakane, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/817,100

(22) Filed: Aug. 3, 2015

(65) Prior Publication Data
US 2016/0042258 A1 Feb. 11, 2016

(30) Foreign Application Priority Data
Aug. 8, 2014 (JP) ................. 2014-162996

(51) Int. Cl.
G06K 15/02 (2006.01)
H04N 1/387 (2006.01)
H04N 1/00 (2006.01)
G06T 11/20 (2006.01)
H04N 1/56 (2006.01)
H04N 1/60 (2006.01)

(52) U.S. Cl.
CPC ..... G06K 15/1889 (2013.01); G06K 15/1822 (2013.01); G06T 11/20 (2013.01); H04N 1/00039 (2013.01); H04N 1/00082 (2013.01); H04N 1/3876 (2013.01); H04N 1/56 (2013.01); H04N 1/6016 (2013.01); H04N 2201/0094 (2013.01)

(58) Field of Classification Search
CPC ........... G06K 15/1889; G06K 15/1822; H04N 1/00039; H04N 1/00082; H04N 1/3876; H04N 1/56; H04N 1/6016; H04N 2201/0094

USPC ................. 358/3.24, 1.9; 707/769, E17.014; 345/634
See application file for complete search history.

(56) References Cited

U.S. PATENT DOCUMENTS

2003/0184773 A1* 10/2003 Borchers ................ G06K 15/02
358/1.9
2010/0245868 A1* 9/2010 Wade ...................... G06T 11/60
358/1.9

FOREIGN PATENT DOCUMENTS

JP 2009-87266 A 4/2009
JP 2014-050993 A 3/2014

* cited by examiner

*Primary Examiner* — Quang N Vo
(74) *Attorney, Agent, or Firm* — Canon USA, Inc. I.P. Division

(57) ABSTRACT

One or more image processing apparatuses, one or more image processing methods and one or more storage mediums are provided herein. In at least one embodiment, an image processing apparatus includes an acquisition unit configured to acquire one or more objects, a check unit configured to perform check processing for checking whether to combine an object with another object, for each of a plurality of objects acquired by the acquisition unit, and a determining unit configured to determine, based on a result of the check processing for each of the plurality of objects, whether to perform the check processing for checking whether to combine an object with another object, for an object acquired subsequently to the plurality of objects by the acquisition unit.

20 Claims, 15 Drawing Sheets

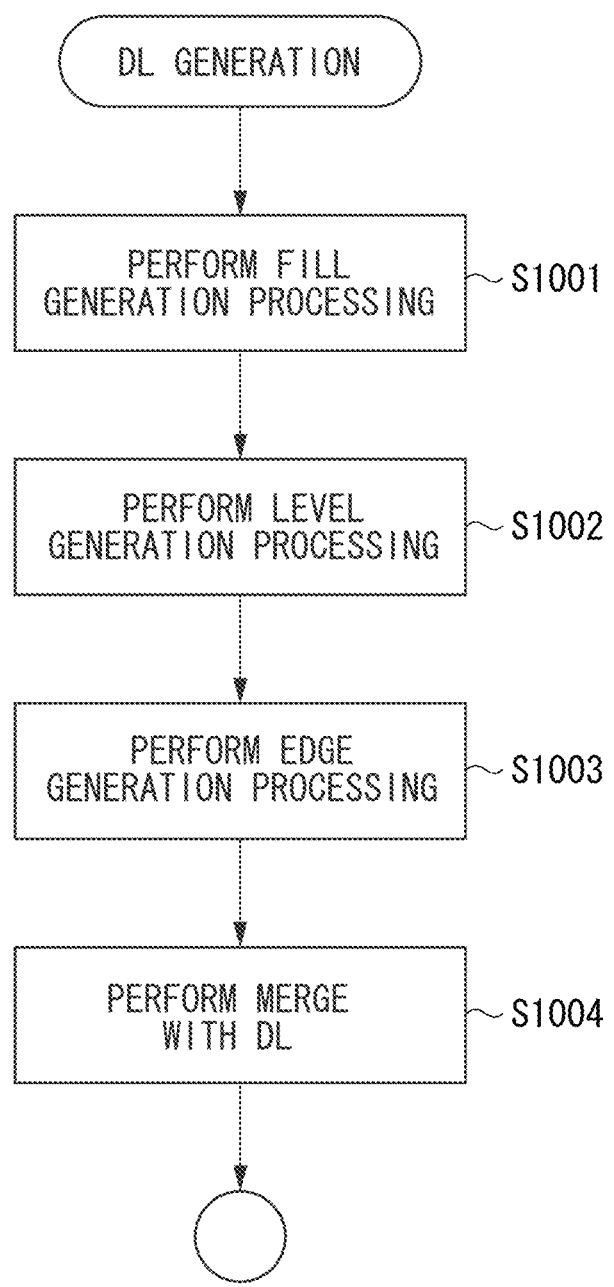

IMAGE PROCESSING APPARATUS AND IMAGE PROCESSING METHOD

BACKGROUND OF THE INVENTION

Field of the Invention

The present disclosure relates to an image processing apparatus, an image processing method, and a storage medium, which can perform drawing-object combination processing.

Description of the Related Art

Japanese Patent Application Laid-Open No. 2009-87266 discusses a technique relating to combining objects. This technique sequentially acquires successive objects included in print data, combines these objects into fewer objects, and performs subsequent processing on each of the fewer objects resulting from this combination. Examples of the subsequent processing include processing of generating a display list (DL) for each object. The cost of such DL generation processing is lower in generating a DL for each of the fewer objects resulting from the combination, than the cost in generating a DL for each of the objects to be combined.

According to Japanese Patent Application Laid-Open No. 2009-87266 described above, processing for combination of objects (e.g., processing of determining whether an object is combinable, and combination processing itself) is performed for each object. However, depending on tendencies of successive multiple objects, the number of objects may not be effectively reduced even if the processing for combination is performed.

For example, there is a case where a first object itself is determined to be a combinable object, a second object is determined to be an object combinable with the first object, and a third object is determined to be an object not combinable with the first and second objects. In this case, performing combination results in two objects, which are an object obtained by combining the first and second objects, and the third object not combined.

The three objects are combined into the two objects, and if the subsequent processing is the DL generation processing, the cost of the DL generation processing is reduced indeed. However, as a matter of course, processing performed for combining the tree objects (i.e., the processing of determining whether an object is combinable, and the combination processing, which are described above) also requires the cost. Therefore, if the processing cost of the combination processing exceeds a reduction in the processing cost of the generation processing, the overall processing cost of generating the DLs based on the drawing objects increases. In other words, the overall processing efficiency decreases, if overhead of the processing for combining the objects is too high.

SUMMARY OF THE INVENTION

It is conceivable to predict whether it is profitable to perform processing for combining three objects, before sequentially acquiring these three objects, in a case similar to the example described above. If such a prediction can be utilized, this approach is effective. In this connection, it is conceivable to perform processing for combining objects, on an object to be processed in the future, only when it is possible to predict that the number of objects can be effectively reduced if combination processing is performed on the object to be processed in the future. The inventor has found that this prediction is achievable by analyzing some of the objects sequentially acquired and processed at present or in the past.

According to an aspect of the present inventions, at least one embodiment of an image processing apparatus includes an acquisition unit configured to acquire one or more objects, a check unit configured to perform check processing for checking whether to combine an object with another object, for each of a plurality of objects acquired by the acquisition unit, and a determining unit configured to determine, based on a result of the check processing for each of the plurality of objects, whether to perform the check processing for checking whether to combine an object with another object, for an object acquired subsequently to the plurality of objects by the acquisition unit.

According to other aspects of the present inventions, one or more additional image processing apparatuses, one or more image processing methods and one or more computer-readable storage mediums are discussed herein. Further features of the present inventions will become apparent from the following description of exemplary embodiments with reference to the attached drawings.

BRIEF DESCRIPTION OF THE DRAWINGS

FIG. 10 is a flow chart illustrating an example of a configuration of DL generation processing according to the present exemplary embodiment.

DESCRIPTION OF THE EMBODIMENTS

A print apparatus according to an exemplary embodiment will be described below with reference to the drawings. The print apparatus according to the present exemplary embodiment may be a multi function printer (MFP), or may be a single function printer (SFP). Further, a print engine (hereinafter merely referred to as "engine") of the print apparatus according to the present exemplary embodiment may employ an inkjet method, an electrophotographic method, or other type of method.

<Hardware Configuration>

Figure 1:
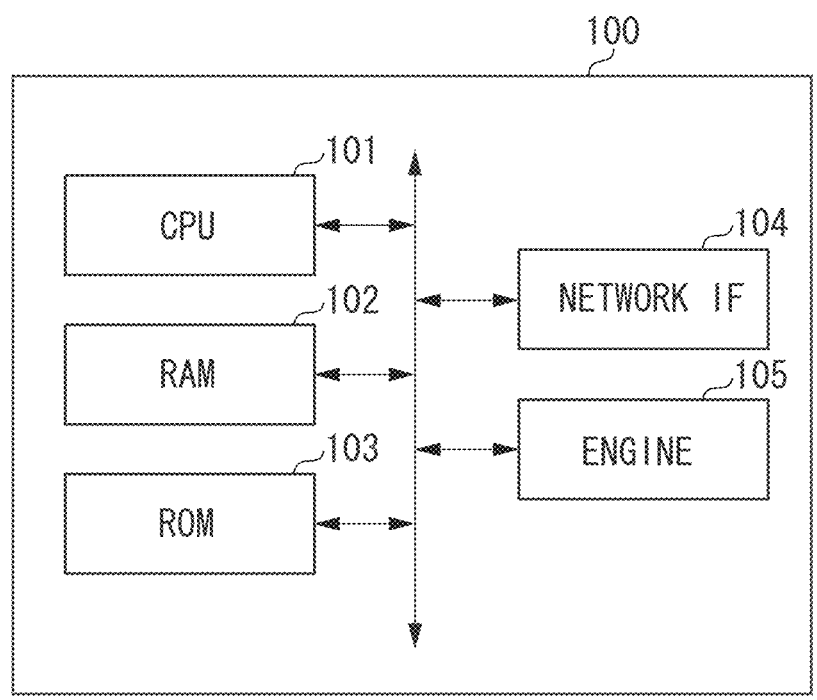
FIG. 1 is a diagram illustrating an example of a hardware configuration of a print apparatus according to an exemplary embodiment.

FIG. 1 is block diagram illustrating an example of a hardware configuration of a print apparatus 100 according to the present exemplary embodiment.

The print apparatus 100 includes a central processing unit (CPU) 101. Software 200 (described below) of the print apparatus 100 operates on the CPU 101. The CPU 101 can access a random access memory (RAM) 102. The RAM 102 is used as a memory required for operations of the software 200 (described below) of the print apparatus 100. The print apparatus 100 further includes a read only memory (ROM) 103. A program of the software 200 (described below) of the print apparatus 100 is stored in the ROM 103, and read by the CPU 101 to be executed. A network interface (IF) 104 is connected to an external device (such as a personal computer (PC) and other print apparatus) via a network such as a local area network (LAN) to mainly receive print data. The print data is page description language (PDL) data (hereinafter may also be merely referred to as "PDL") including a drawing command of an object described in a page description language. An engine 105 is a print engine for printing an image on a print sheet, based on the PDL interpreted by the CPU 101. In the present exemplary embodiment, receiving the PDL from the external device via the network will be described as an example. However, an image can be similarly printed, by reading PDL from the RAM 102 when the PDL is stored in the RAM 102, not by receiving the PDL from the external device.

<Software Configuration>

Figure 2:
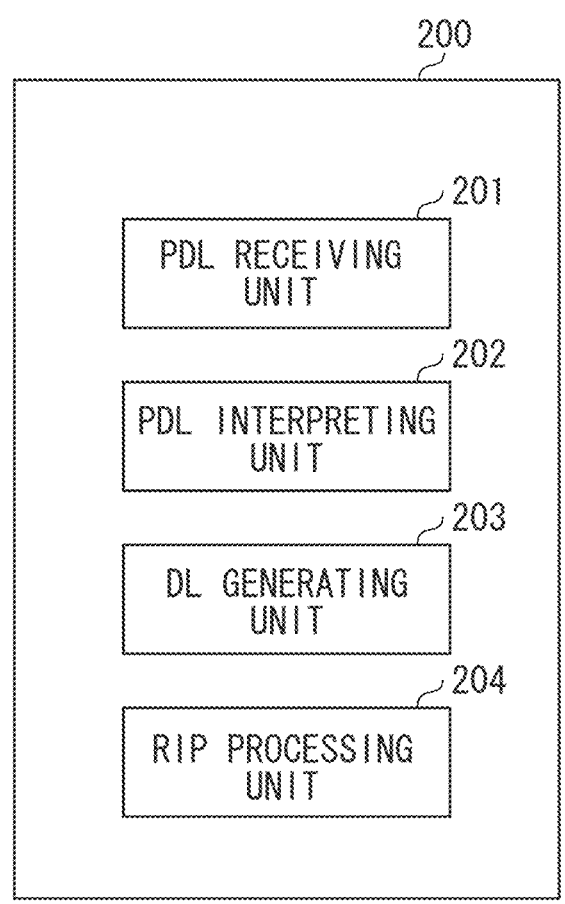
FIG. 2 is a diagram illustrating an example of a software module configuration of the print apparatus according to the present exemplary embodiment.

FIG. 2 is a diagram illustrating an example of a software configuration of the print apparatus 100 according to the present exemplary embodiment.

The software 200 of the print apparatus 100 includes four software modules. All of these software modules are implemented by the CPU 101 executing the program stored in the ROM 103.

A PDL receiving unit 201 is a module for receiving PDL via the network IF 104. The received PDL is stored in the RAM 102.

A PDL interpreting unit 202 is a module for reading a drawing command included in the stored PDL, and then interpreting the read drawing command. The PDL interpreting unit 202 determines information (attribute information, path shape information, operand information, and operator information) of an object, according to this drawing command, and generates the object. Next, the information of the object will be described below.

Figure 4:
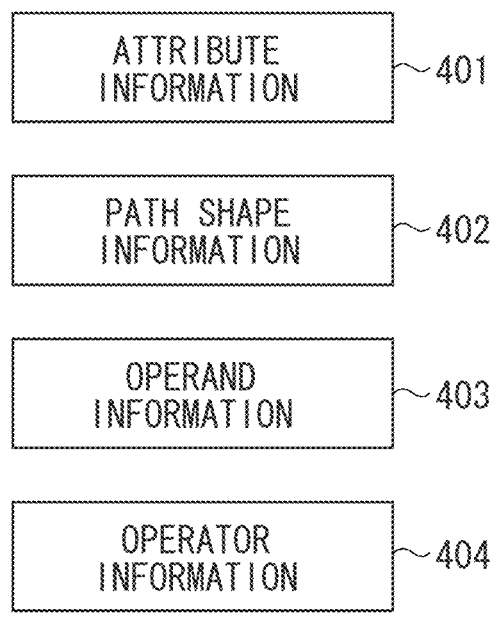
FIG. 4 is a diagram illustrating an example of a configuration of an object according to the present exemplary embodiment.

FIG. 4 is a diagram illustrating the information included in the object generated by the PDL interpreting unit 202. The information represents attribute information 401, path shape information 402, operand information 403, and operator information 404.

The attribute information 401 is information indicating an attribute of the object. This information is used to switch contents of image processing depending on the attribute. Examples of the type of the attribute include a graphics attribute, an image attribute, a line attribute, and a text attribute.

The path shape information 402 is information about a drawing position and a shape of the object, such as information indicating a drawing range of the object, and path point sequence information expressing an external form of the object by using a point sequence. For example, when the drawing range of the object can be expressed by a rectangle, the information indicating the drawing range of the object includes coordinates of an upper left corner and coordinates of a lower right corner, of the rectangle. The path point sequence information includes coordinates of each path point.

The operand information 403 is information about drawing, such as an operand type (such as monochrome fill and image fill) of the object, and a color space (such as RGB and Gray). The monochrome fill represents designation of filling with a single color such as "white", and the image fill represents, for example, designation of filling of an image such as a bitmap image.

The operator information 404 is information about an object overlaying order. For example, the operator information includes information indicating a type of raster operation (ROP) designated for the object. Known types of ROP include ROP2 and ROP3.

The object includes the information as described above.

A display list (DL) generating unit 203 is a module for generating a DL that is intermediate data, based on the object generated by the PDL interpreting unit 202. Submodules of the DL generating unit 203 will be described below with reference to FIG. 3.

A raster image processing (RIP) processing unit 204 is a module for performing rendering of a page based on the DL generated by the DL generating unit 203. Performing the rendering of the page based on the DL corresponds to generating a bitmap image of a page expressed by the DL.

<Submodules of DL Generating Unit>

Figure 3:
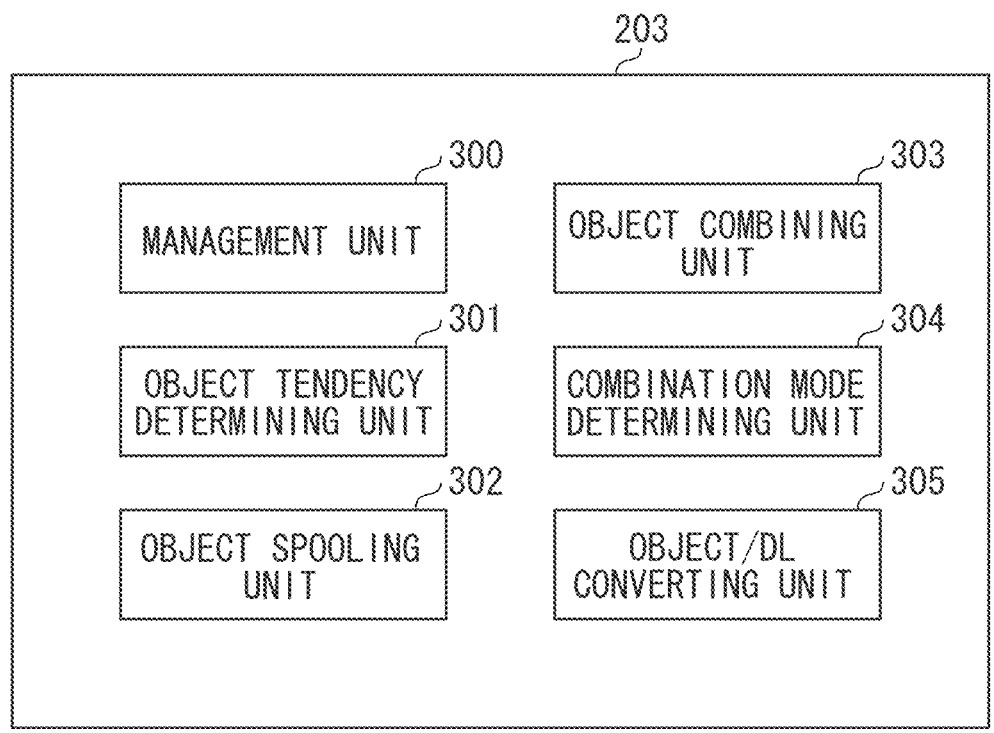
FIG. 3 is a diagram illustrating an example of a submodule of a display list (DL) generating unit according to the present exemplary embodiment.

FIG. 3 is a diagram illustrating an example of a submodule software configuration of the DL generating unit 203 according to the present exemplary embodiment.

A management unit 300 is a submodule for controlling processing, according to a combination mode or a combination determination result.

An object tendency determining unit 301 is a submodule for determining whether to switch combination modes, based on (1) information of a current object in process, and (2) a relationship between the information of the current object in process and information of an object having been processed before. The combination modes will be described below.

The PDL includes successive drawing commands from the head to the tail of the PDL. Objects generated based on the respective successive drawing commands are also successive. In general, objects successive in a sequence have similar tendencies. For example, an object having a high combination effect (to be described below) is followed by an object similarly having a high combination effect. Likewise, for example, an object having a low combination effect is followed by an object similarly having a low combination effect.

The combination effect described here is a ratio M/N that is determined when, for example, N objects are obtained as a result of combination processing performed on M objects by an object combining unit 303. The object having a high combination effect is an object having a large M/N that is determined when the combination processing is performed on M objects including this object. In contrast, the object having a low combination effect is an object having a relatively small M/N that is determined when the combination processing is performed on M objects including this object.

There may be a change from an object tendency indicating a high combination effect to an object tendency indicating a low object effect, or a change opposite thereto. Such a change can be detected, based the information of the current object in process and the result of combining the objects having been processed before.

An object spooling unit 302 is a submodule for spooling an object in process. The spooled object is stored in the RAM 102.

The object combining unit 303 is a submodule for performing combination of objects spooled by the object spooling unit 302. The combination of the objects will be described below.

A combination mode determining unit 304 is a submodule for determining whether to switch the combination modes, based on a combination effect of the objects combined by the object combining unit 303.

An object/DL converting unit 305 is a submodule for converting an object into a DL. This object-DL conversion may also be referred to as "DL generation".

The combination modes include a combination forward mode and a combination stop mode.

In the combination forward mode, processing (step S604 in FIG. 6) for determining whether to combine a current object in process with a spooled object is performed with respect to the current object in process. This determination is made based on information of the object in process and information of the spooled object. Based on this determination, processing for spooling the object in process or processing for combining the spooled objects is performed. In other words, the combination forward mode is a first mode in which combination determination processing is performed on the object in process, and then spool processing or combination processing is performed according to a result of this determination processing.

On the other hand, in the combination stop mode, the processing (step S604 in FIG. 6) for determining whether to combine the current object in process with the spooled objected is skipped. Therefore, processing cost of this determination processing can be reduced. Further, the spool processing (step S606 in FIG. 6) for the current object in process, or the combination processing (step S607 in FIG. 6) for the spooled object is also skipped, and processing (step S609 in FIG. 6) for converting the current object in process into a DL is performed. Thus, the DL can be generated, while reducing the processing cost of the spool processing and the combination processing that are unnecessary. In other words, the combination stop mode is a second mode in which the determination processing, the spool processing, and the combination processing that are performed in the combination forward mode are omitted.

Switching between these combination modes is performed, based on a state of an object before combination and a state of the object after the combination, and information of an object having been subjected to skipping. The switching between the combination modes will be described in detail below, with reference to FIG. 6.

<Print Processing>

Figure 5:
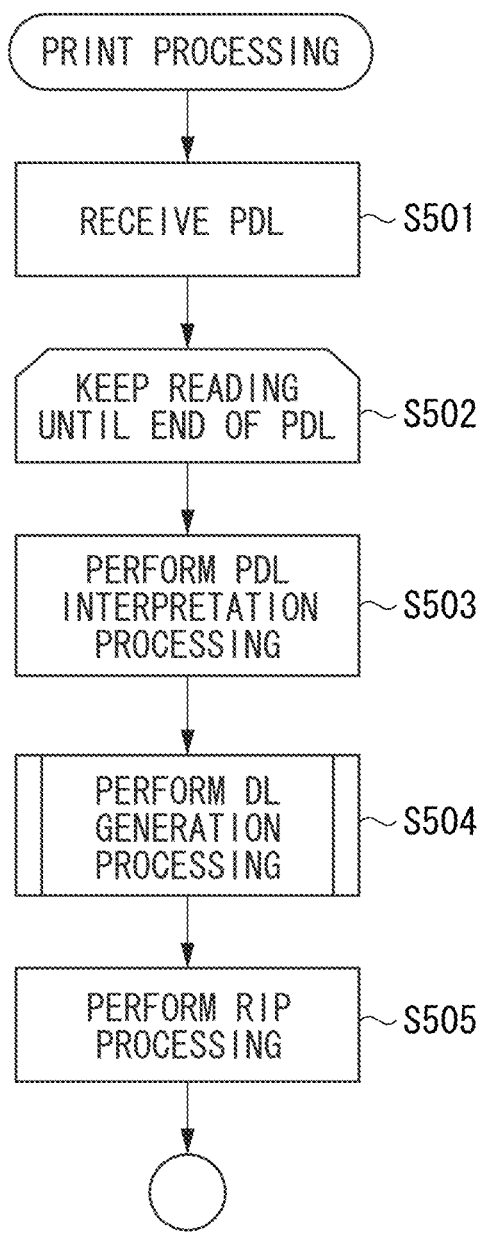
FIG. 5 is a flow chart illustrating an example of a print method according to the present exemplary embodiment.

FIG. 5 is a flow chart illustrating print processing performed by the print apparatus 100 according to the present exemplary embodiment. The processing illustrated in FIG. 5 is implemented by the CPU 101 executing the program stored in the ROM 103.

In step S501, the PDL receiving unit 201 receives PDL via the network IF 104.

In step S502, drawing commands included in the PDL are sequentially read one by one from the initial position, until reading of all the drawing commands included in the PDL received in step S501 is completed. This processing of reading the drawing commands one by one in step S502 corresponds to processing of sequentially acquiring objects. Step S503 and step S504 described below are repeated for one of the read drawing commands.

In step S503, the PDL interpreting unit 202 interprets the one of the drawing commands read in step S502, and generates an object.

In step S504, the DL generating unit 203 generates a DL, from the object generated in step S503. This flow will be described in detail below with reference to FIG. 6.

In step S505, the RIP processing unit 204 performs rendering of each page, based on the DL generated in step S504. A bitmap image of each page obtained by the rendering is sent to the engine 105, to be printed on a sheet.

<Processing of DL Generating Unit>

Figure 6:
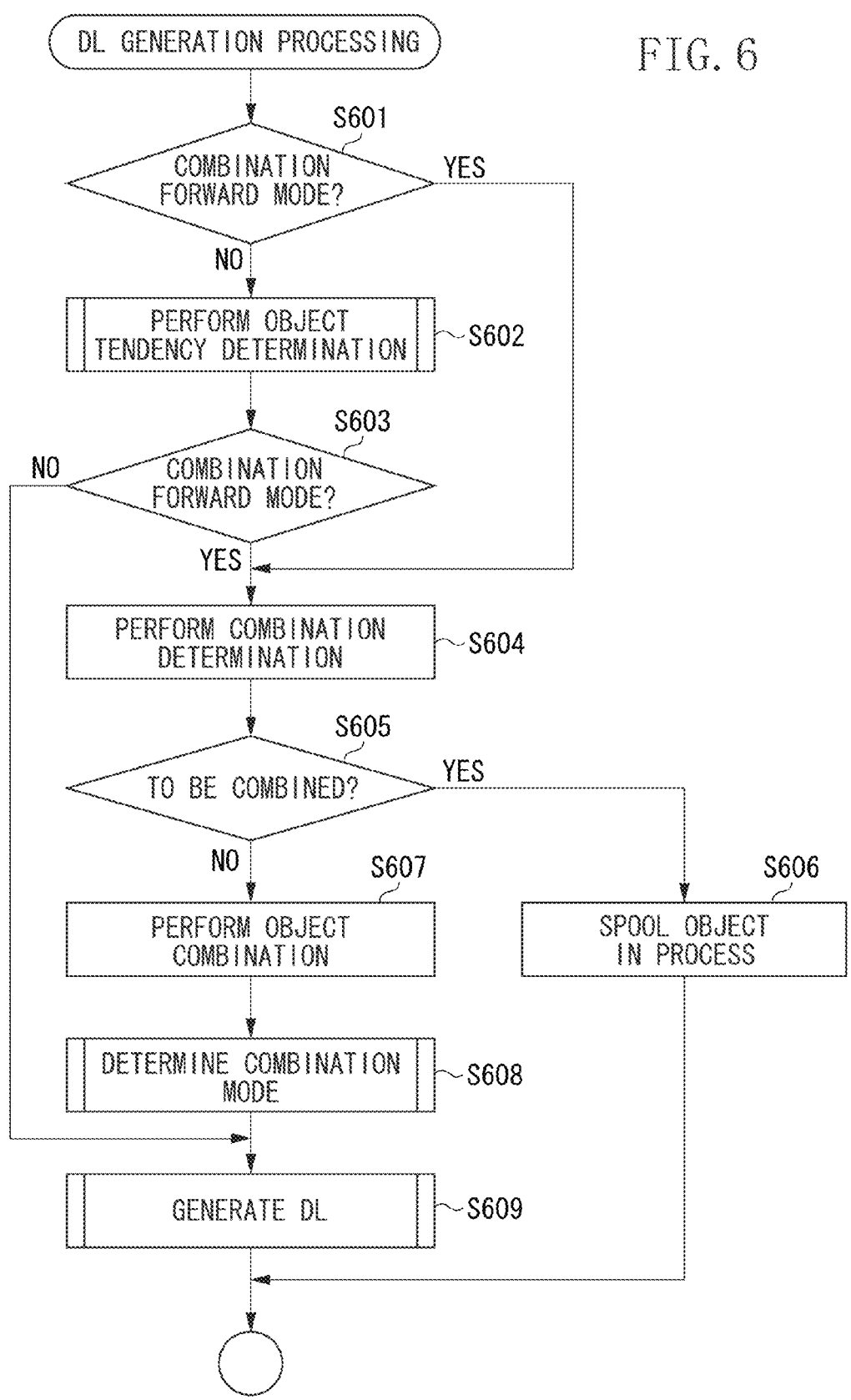
FIG. 6 is a flow chart illustrating an example of DL generation processing according to the present exemplary embodiment.

FIG. 6 is a flow chart illustrating details of processing performed by the DL generating unit 203 in step S504 in the present exemplary embodiment. In this flow, (1) spooling an object, (2) generating a DL after combining spooled objects, and (3) generating a DL without performing spooling and combination, are switched from one to another, based on (1) the combination mode and (2) an object in process. The initial state of the combination mode in the present exemplary embodiment is assumed to be the combination forward mode, but may be the combination stop mode.

In step S601, the management unit 300 determines whether the current combination mode is the combination forward mode. When it is determined that the current combination mode is the combination forward mode (YES in step S601), the processing proceeds to step S604. In step S604, combination determination is performed for the current object in process. When it is determined that the current combination mode is not the combination forward mode (NO in step S601), the processing proceeds to step S602, assuming that the current combination mode is the combination stop mode. In step S602, it is determined whether the current object in process and a subsequent object are objects for which the combination determination in step S604 is to be performed.

In step S602, the object tendency determining unit 301 determines an object tendency, based on information of the current object in process and information of an object having been processed before. In other words, this processing corresponds to performing object tendency determination processing, on some objects, which correspond to the drawing commands having already been read, among the drawing commands to be read in the processing in step S502. The object tendency determination is performed to find whether the subsequent object is highly likely to be suitable for combination (a combination effect is high). In other words, in this processing, the combination mode for an object to be processed in the future is determined or temporarily determined, based on the information of the object currently being processed and the object processed in the past.

This determination processing is performed in the combination stop mode, to find a timing for leaving the combination stop mode. In the present exemplary embodiment, this timing corresponds to a timing, at which performing the processing (step S604 to step S608) for combination on a subsequent object is determined to bring efficiency, based on the information of the current object and the object having been processed before. This determination processing will be described below with reference to FIGS. 7A, 7B, and 7C.

In step S603, the management unit 300 switches the processing according to the current combination mode. When the current combination mode is the combination forward mode (YES in step S603), the processing proceeds to step S604. When the current combination mode is the combination stop mode (NO in step S603), the processing proceeds to step S609. In this way, when the combination mode is the combination stop mode, subsequent steps S604 to S608 are skipped, which can reduce the processing cost that is required each time the determination and the spooling are performed.

In step S604, the object combining unit 303 determines whether the current object in process is an object to be combined with other spooled object. This determination is performed on, for example, such a determination condition that the distance between the drawing position of the current object and the drawing position of the other spooled object is equal to or greater than a threshold. In this example, if the distance between these drawing positions is equal to or greater than the threshold, it is determined that the current object and the other spooled object are not to be combined. If the distance between these drawing positions is smaller than the threshold, it is determined that the current object and the spooled object are to be combined. The drawing position of the current object corresponds to the coordinates of an upper left corner of a rectangle (a bounding box) surrounding the current object. The drawing position of the other spooled object corresponds to the coordinates of an upper left corner of a rectangle (a bounding box) surrounding all the other spooled objects.

The above-described determination condition is only an example, and other determination conditions may be used. For example, the determination may be performed on such a condition that occupation dimensions of the current object and the other spooled object, with respect to a rectangle (a bounding box) surrounding the current object and the other spooled object, are smaller than a threshold. It is determined that the combination is not to be performed if the occupation dimensions are smaller than the threshold. On the other hand, if the occupation dimensions are equal to or greater than the threshold, it is determined that the combination is to be performed.

When there is no spooled object to be combined, it is determined that the combination is to be performed, because the current object in process may be combinable with a subsequent object.

In step S605, the management unit 300 switches the processing according to a result of the determination in step S604. When it is determined that the current object in process is an object to be combined with other spooled objects (YES in step S605), the processing proceeds to step S606. When it is determined that the current object in process is an object not to be combined with other spooled objects (NO in step S605), the processing proceeds to step S607.

In step S606, the object spooling unit 302 spools the current object in process. It is assumed here that the spooling is performed, for the purpose of description. However, in this step, the object combining unit 303 may combine the current object in process with the spooled object, beforehand.

In step S607, the object combining unit 303 receives input of one or more spooled objects. The object combining unit 303 then performs the combination processing, on these one or more input objects, and outputs one or more objects resulting from the combination processing. Further, the object combining unit 303 deletes the spooled objects having been subjected to the combination processing. This combination processing includes check processing and output processing. The check processing is performed on each of the one or more input objects, to check whether to combine the input object with another object. The output processing is performed to output one or more final objects resulting from the combination processing, according to a result of this check processing performed on each of the one or more input objects. In other words, the number of objects to be output is determined, according to the result of the check processing. That is to say, by using the result of the combination (or the result of the check processing) for each object acquired in the past, it is (temporarily) determined whether to perform the check processing for checking whether to perform combination for the current object or an object to be acquired in the future. When there is only one spooled object, the object combining unit 303 performs nothing in the combination processing and outputs an input object as is.

As a method for combining objects, a method called "multipath combining" will be described in the present exemplary embodiment. In the multipath combining, objects having different attributes are divided according to the attributes, and then combined. For example, when that multipath combining processing is performed on objects including objects each having an image attribute and objects each having a graphics attribute, one object having a graphics attribute and one object having an image attribute are output as a combination result.

In the multipath combining, if attributes, operand types, or color spaces of the respective objects are different, these objects cannot be combined. Therefore, the object combining unit 303 checks attribute information, an operand type included in operand information, and color space information, of each of the current object in process and the spooled object to perform the combination processing.

Figure 8A:
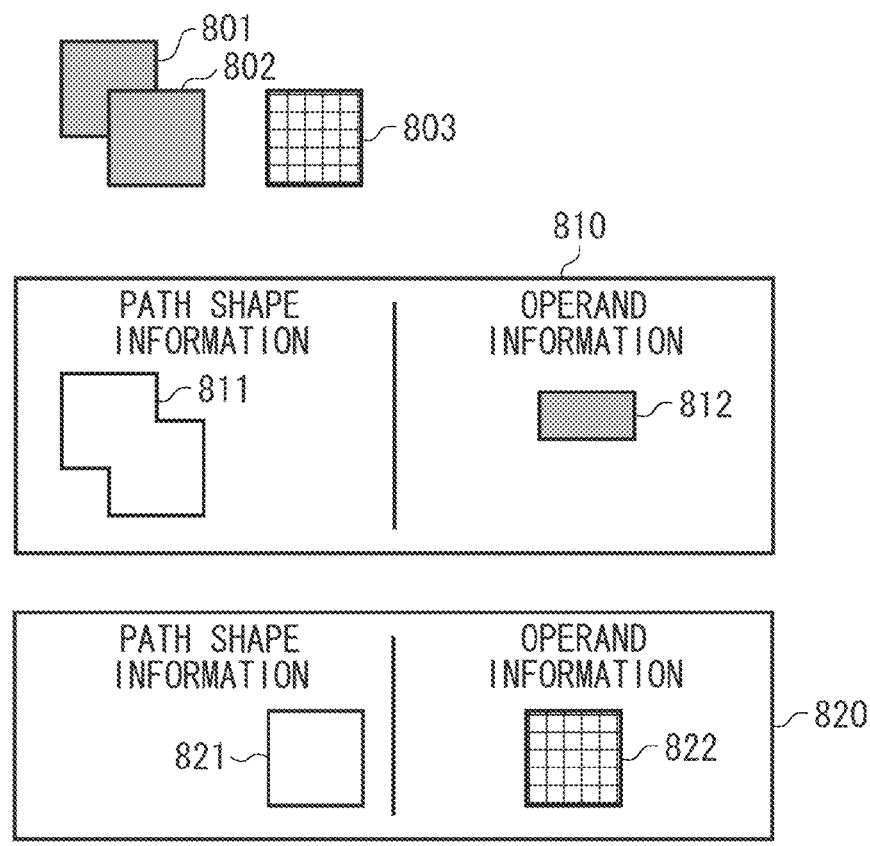
FIGS. 8A and 8B are diagrams each illustrating an example of a received object and a combination result according to the present exemplary embodiment.
Figure 8B:
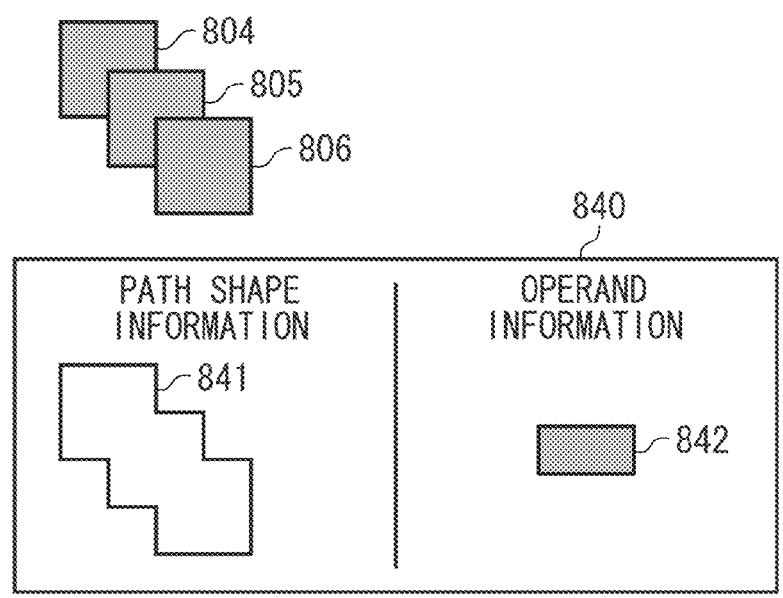

An example of the multipath combining for input objects will be described with reference to FIGS. 8A and 8B. FIGS. 8A and 8B illustrate two different cases, respectively, of performing the multipath combining for three rectangular objects. Spooled objects 801 to 806 correspond to objects illustrated in Table 1. Herein, it is determined that the current object in process is not an object to be combined with the spooled object.

FIG. 8A illustrates the objects 801, 802, and 803. Each of the objects 801 and 802 is a rectangular object of a white monochrome fill to be drawn by overwriting, and having a graphics attribute. The object 803 is a rectangular object of an image fill, to be drawn by overwriting (ROP2: COPYPEN), and having an image attribute.

FIG. 8B illustrates the objects 804, 805, and 806. Each of the objects 804, 805, and 806 is a rectangular object of a white monochrome fill to be drawn by overwriting (ROP2: COPYPEN), and having a graphics attribute.

TABLE 1

| Object | Attribute information | Path shape information | Operand information | Operator information |
|---|---|---|---|---|
| Object 801 | Graphics | Rectangle | RGB monochrome fill (white) | ROP2 COPYPEN |
| Object 802 | Graphics | Rectangle | RGB monochrome fill (white) | ROP2 COPYPEN |
| Object 803 | Image | Rectangle | RGB image fill | ROP2 COPYPEN |
| Object 804 | Graphics | Rectangle | RGB monochrome fill (white) | ROP2 COPYPEN |

TABLE 1-continued

| Object | Attribute information | Path shape information | Operand information | Operator information |
|---|---|---|---|---|
| Object 805 | Graphics | Rectangle | RGB monochrome fill (white) | ROP2 COPYPEN |
| Object 806 | Graphics | Rectangle | RGB monochrome fill (white) | ROP2 COPYPEN |

Results of performing the multipath combining on such objects are illustrated in FIGS. 8A and 8B as well as Table 2.

FIG. 8A illustrates that objects 810 and 820 are output as a result of performing the multipath combining for the objects 801 to 803.

As illustrated in Table 2, in the object 810, attribute information is graphics, path shape information is a path 811, operand information is a white monochrome fill 812 in RGB color space, and operator information is COPYPEN (overwriting) of ROP2. In other words, the object 810 is an object having a graphics attribute, and corresponding to the path 811 to be drawn by overwriting and having inside filled with white.

As illustrated in Table 2, in the object 820, attribute information is image, path shape information is a path 821, operand information is an image 822 in RGB color space, and operator information is COPYPEN of ROP2. In other words, the object 820 is an object having an image attribute, and corresponding to the image 822 to be drawn by overwriting and clipped by the path 821.

On the other hand, FIG. 8B illustrates that an object 840 is output as a result of performing the multipath combining for the objects 804 to 806.

As illustrated in Table 2, in the object 840, attribute information is graphics, path shape information is a path 841, operand information is a white monochrome fill 842 in RGB color space, and operator information is COPYPEN of ROP2. In other words, the object 840 is an object having a graphics attribute, and corresponding to the path 841 to be drawn by overwriting and having inside filled with white.

TABLE 2

| Object | Attribute information | Path shape information | Operand information | Operator information |
|---|---|---|---|---|
| Object 810 | Graphics | Path 811 | RGB monochrome fill (white) 812 | ROP2 COPYPEN |
| Object 820 | Image | Path 821 | RGB image 822 | ROP2 COPYPEN |
| Object 840 | Graphics | Path 841 | RGB monochrome fill (white) 842 | ROP2 COPYPEN |

As apparent from the above description, the objects 801 and 802 are combined into one object, and the object 803 is not combined with other objects. As a result, the ratio between the number of objects before the combination and the number of objects after the combination is 3:2. On the other hand, the objects 804 to 806 are combined into one object. As a result, the ratio between the number of objects before the combination and the number of objects after the combination is 3:1. In other words, it can be said that a combination effect is higher in performing the multipath combining for the objects 804 to 806, than the combination effect in performing the multipath combining for the objects 801 to 803. Performing the multipath combining for an object group having such a high combination effect reduces the processing cost in generating a DL described below.

In step S608, the combination mode determining unit 304 determines whether to switch the combination modes by analyzing the object resulting from the combination in step S607, thereby determining or temporarily determining the combination mode. That is to say, this processing corresponds to performing combination mode determination processing, on some objects, which correspond to the drawing commands already read, among the drawing commands to be read in the processing of step S502. In other words, the combination mode for an object to be processed in the future is determined, based on the information of the object currently being processed and the object processed in the past. This determination processing will be described below with reference to FIG. 9.

In step S609, the object/DL converting unit 305 converts an object into a DL. If the processing directly hops from step S603 to this step S609, there is only one object, and therefore, the object/DL converting unit 305 converts this one object into a DL. On the other hand, if the processing arrives at this step S609 via step S604 to step S608, the object/DL converting unit 305 converts the object resulting from the combination in step S608 into a DL, and spools the current object in process, as with step S606. If the current object in process is generated from the tail drawing command included in the PDL, the object/DL converting unit 305 converts the object having been spooled so far, into a DL.

This processing of conversion into a DL will be described below with reference to FIGS. 10 and 11.

<Object Tendency Determination Processing>

The determination processing in step S602 will be described with reference to FIG. 7A. This determination processing is performed to determine whether the tendency of each of the current object in process and the subsequent object changes from "a tendency indicating that objects expected to produce a low combination effect are successive" to "a tendency indicating that objects expected to produce a high combination effect are successive". Conceptually, this determination processing is processing of predicting the tendency of a future object, based on the tendency of the present or past object. Such a change in tendency is determined to process a subsequent object in the combination forward mode. When it is determined that the tendency changes, the combination mode is switched from the combination stop mode to the combination forward mode. By thus switching the combination modes, skipping of combination of objects expected to produce a high combination effect can be suppressed.

Step S603 where branch processing is performed is provided between the determination processing in step S602 and the determination processing in step S604. Therefore, the determination processing in step S604 can be efficiently skipped, depending on the determination result obtained in step S602. In the present exemplary embodiment, it is desirable that the processing cost of the determination processing in step S602 be lower than the processing cost of the determination processing in step S604. For example, only information of the current object in process and the nearest previous two objects may be used in the determination processing in step S602, whereas information of all the objects spooled in step S606 may be used in the determination processing in step S604. Alternatively, the number of processing steps of the determination processing in step S602 may be smaller than the number of processing of steps of the determination processing in step S604. This allows the processing cost when the processing in step S602 is always performed for every object, to be smaller than the processing cost when the processing in step S604 is always performed for every object.

In step S701 and step S702 (step S705) described below, the object tendency determining unit 301 determines whether the current object in process is a specific (predetermined) object that triggers switching of the combination modes from the combination stop mode to the combination forward mode.

In step S701, the object tendency determining unit 301 determines whether ROP3 is designated as ROP information of the operator information of the current object in process. An object in which ROP3 is designated as the ROP information of the operator information will be referred to as "object with ROP3 being designated". The inventor has found that when the object with ROP3 being designated is input, a subsequent object to be input is highly likely to be also an object with ROP3 being designated. In addition, the inventor has noticed that, when the object combining unit 303 performs the combination processing on these successively input objects with ROP3 being designated, a combination effect is very high in many cases. For example, an object, in which ROP3 (e.g., 0×CA) corresponding to clipping of an image is designated, tends to be followed by an object in which ROP3 (e.g., 0×CA) is similarly designated. Images to be clipped by the respective objects are highly likely to be identical. When the combination processing is performed on this series of objects, these objects are combined into one object in which one clipping mask is set for one image, so that a high combination effect is achieved.

Therefore, if ROP3 is designated as the ROP information (YES in step S701), the processing proceeds to step S706. If ROP other than ROP3 is designated (NO in step S701), the processing proceeds to step S702.

In step S702, the object tendency determining unit 301 determines whether the current object in process is an object suitable for combination. The object suitable for combination is an object expected to produce a high combination effect if the object is combined with another object having been processed immediately before. The followings are examples of a condition for determining that the current object in process is the object suitable for combination.

Condition (1): the operand type of the current object in process is a monochrome fill, and the number of colors determined by adding the color of this monochrome fill to the colors of the monochrome fills of objects having been successively processed before is equal to or smaller than a color number threshold. More specifically, this is such a condition that the sum of the color types of the monochrome fills of the objects, which are successively processed until an object count to be described below exceeds a count threshold, is equal to or smaller than the color number threshold. In the present exemplary embodiment, "1" is set as the color number threshold. If "1" is set as the color number threshold, the object in process is determined to be the object suitable for combination, when the color of the monochrome fill of the current object in process is the same as the color of the monochrome fill of the object having been processed immediately before. The color number threshold may be other than "1".

Condition (2): the operand type of the current object in process and the operand type of an object having been processed immediately before are both image fills, and the attribute of the current object in process and the attribute of the object having been processed immediately before are identical. For example, this condition is satisfied when objects of image fills each indicating a broken line (a line attribute) are successive.

Condition (3): the attribute of the current object in process and the attribute of an object having been processed immediately before are identical, and the drawing position of the attribute of the current object in process and the drawing position of the attribute of the object having been processed immediately before are within a predetermined distance (close to each other).

The determination as to whether the object is the object suitable for combination is performed as follows, for example. The object tendency determining unit 301 stores a history of each of the attribute information, the operand type, and the drawing position of an object having been processed before. Based on these histories, the object tendency determining unit 301 determines whether the current object in process satisfies any of the conditions (1) to (3) for determining that this object is the object suitable for combination. When satisfying any of these conditions, the current object in process is determined to be the object suitable for combination. If the current object in process is determined to be the object suitable for combination (YES in step S702), the processing proceeds to step S704. If the current object in process is not determined to be the object suitable for combination (NO in step S702), the processing proceeds to step S703.

In step S703, the object tendency determining unit 301 sets the object count to 0. The object count indicates how many objects suitable for combination are successively processed. Afterward, the object tendency determination processing ends.

In step S704, the object tendency determining unit 301 increments the object count by one.

In step S705, the object tendency determining unit 301 compares the object count with a count threshold. The count threshold expresses successiveness of objects suitable for combination. In other words, if the object count exceeds the count threshold, an object suitable for combination can be assumed to follow the current object in process. In this case (YES in step S705), the subsequent object is likely to produce a high combination effect and therefore, the processing proceeds to step S706. Otherwise (NO in step S705), the object tendency determination processing ends.

In step S706, the object tendency determining unit 301 shifts the current combination mode to the combination forward mode. Afterward, the object tendency determination processing ends. In addition, the object count is initialized to 0.

The object tendency determination processing is thus performed.

<Determination of Combination Mode after Object Combination>

Figure 9:
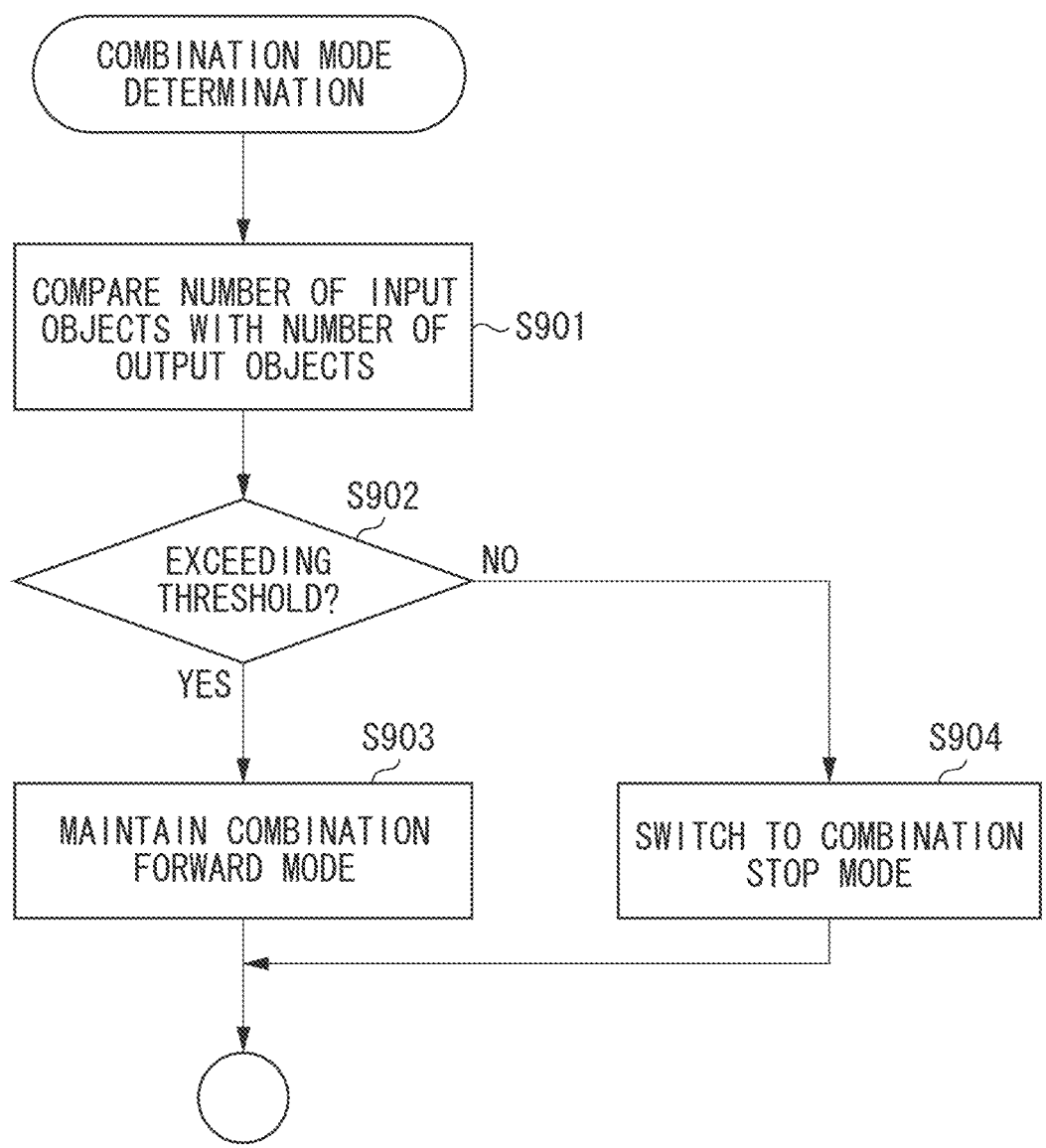
FIG. 9 is a flow chart illustrating an example of a configuration of combination mode determination according to the present exemplary embodiment.

The determination processing in step S608 will be described with reference to FIG. 9.

In this determination processing, whether to switch the combination modes is determined based on the combination effect of the combination processing in step S607.

In step S901, the combination mode determining unit 304 acquires the number of input objects (the number of spooled objects) subjected to the combination processing in step S607, and the number of output objects (the number of objects after the combination). The combination mode determining unit 304 then calculates a ratio, by dividing the number of input objects by the number of output objects. This calculated ratio represents the combination effect. For instance, as for the examples described with reference to FIGS. 8A and 8B, the calculated ratio is "1.5" in FIG. 8A, and the calculated ratio is "3" in FIG. 8B.

In step S902, the combination mode determining unit 304 determines whether the ratio calculated in step S901 exceeds a reduction threshold. If the ratio calculated in step S901 exceeds the reduction threshold (YES in step S902), the combination mode determining unit 304 determines that an effect of reducing the number of output objects by the combination processing is high (the combination effect is high), and the processing proceeds to step S903. If the ratio calculated in step S901 does not exceed the reduction threshold (NO in step S902), the processing proceeds to step S904.

In step S903, the combination mode determining unit 304 maintains the combination forward mode as the combination mode.

In step S904, the combination mode determining unit 304 switches the combination mode to the combination stop mode.

For example, in a case where "2" is set as the reduction threshold, the combination effect is assumed to be low if the combination processing cannot halve the number of objects. In the example described with reference to FIG. 8A, the combination forward mode is maintained in image combining, but the combination mode is switched to the combination stop mode in the multipath combining.

The above-described determination is based on the following expectations.

(1) When the combination processing for objects successively preceding the current object in process produces a high combination effect, a subsequent object also produces a high combination effect.

(2) When the combination processing for objects successively preceding the current object in process produces a low combination effect, a subsequent object also produces a low combination effect.

This is because successive objects have similar tendencies.

The determination processing in step S608 is thus performed.

<DL of Object>

The conversion process in step S609 will be described with reference to FIGS. 10, 11A, and 11B.

First, a structure of the DL generated by the conversion in step S609 will be described with reference to FIGS. 11A and 11B.

Figure 11A:
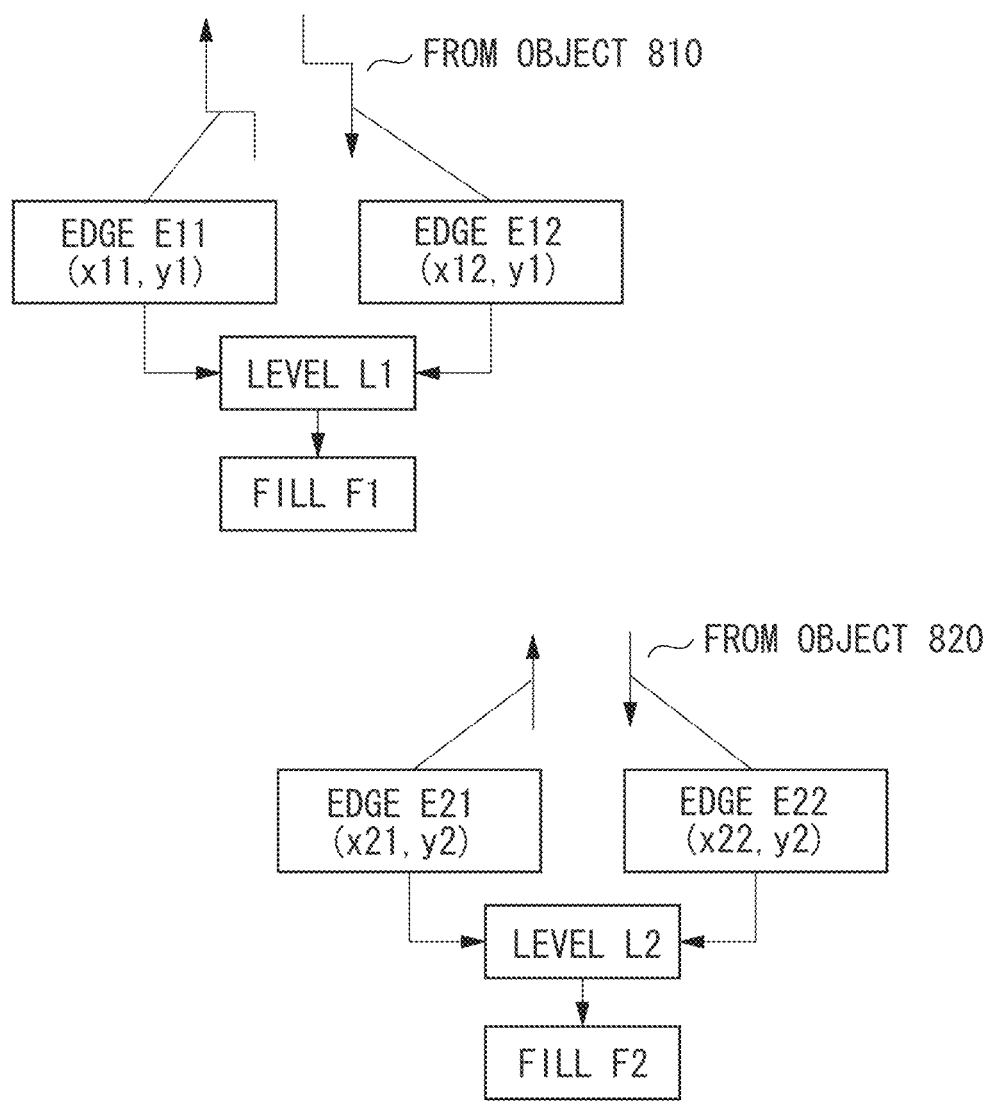
FIGS. 11A and 11B are diagrams each illustrating examples of a configuration of a DL according to the present exemplary embodiment.

FIG. 11A exemplifies a DL generated from the objects 810 and 820 illustrated in FIG. 8A. This DL includes edges E11, E12, E21, and E22. The edges E11 and E12 each have a link to a level L1, and the level L1 has a link to a fill F1. The edges E21 and E22 each have a link to a level L2, and the level L2 has a link to a fill F2.

Each of these edges is information representing the shape of the corresponding object. Each of these edges is generated from the path shape information of the corresponding object. For example, in the object 810, a left edge and a right edge of the shape of the path 811 are generated as the edges E11 and E12, respectively. The edges E11 and E12 have coordinates (x11, y1) and coordinates (x12, y1), respectively, each serving as the coordinates of an edge starting point. Meanwhile, the edges E21 and E22 have coordinates (x21, y2) and coordinates (x22, y2), respectively, each serving as the coordinates of an edge starting point.

The level referred to from each of the edges is information representing the position of the corresponding object in the object overlaying order. Each of the levels is assigned based on the position of the corresponding object in the order in which the objects are generated. For example, the objects 810 and 820 are simultaneously generated by the combination processing and therefore, the positions in the order that are assigned to the levels L1 and L2 are identical. The level indicates that the higher the position in the order is, the lower the layer in the overlaying order is.

The fill referred to from each of the levels is information representing filling of the corresponding object. Each of the fills is generated based on the operand information of the corresponding object. For example, in the object 810, the operand information includes the white monochrome fill 812 and therefore, the fill F1 referred to from the level L1 is information indicating the white monochrome fill.

The edge, the level, and the fill described above are included in the DL generated from the object.

Figure 11B:
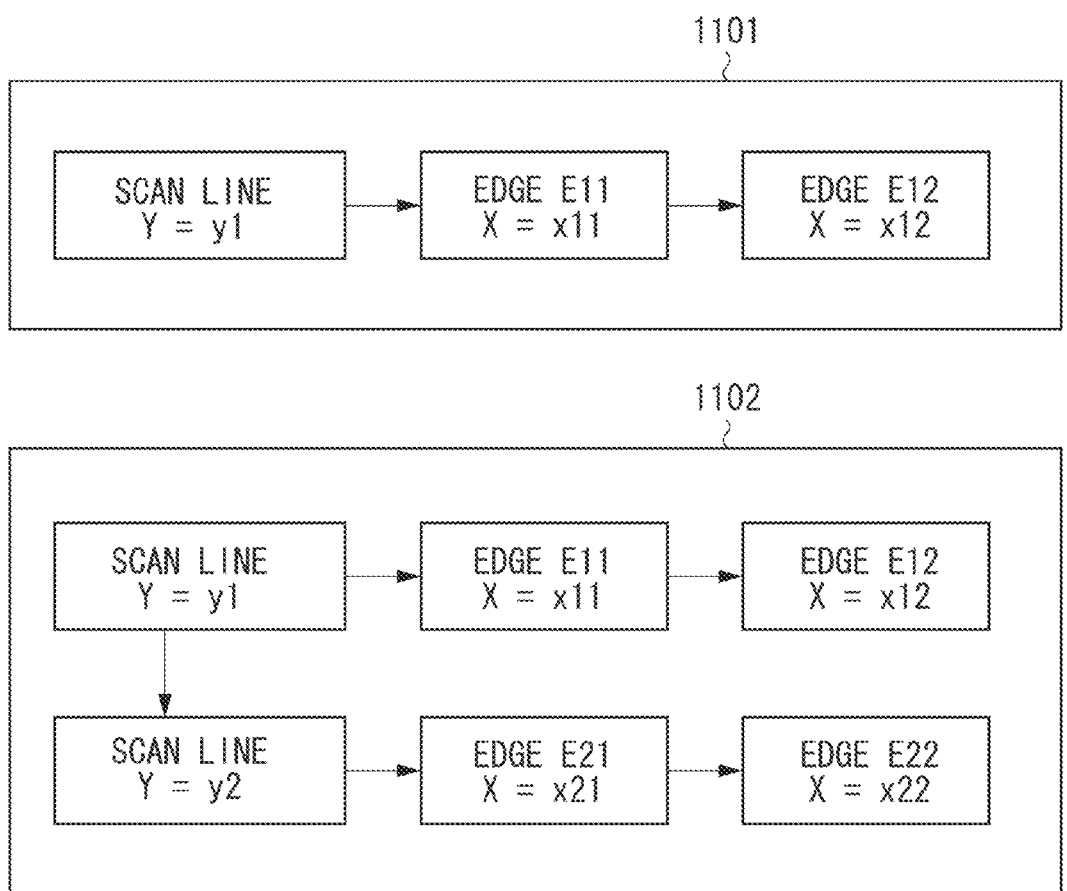

FIG. 11B exemplifies a list structure of edges included in a DL 1101 generated from the object 810, and a list structure of edges included in a DL 1102 obtained after a DL generated from the object 820 is added to (merged with) the DL 1101.

A list structure of edges included in a DL is generated based on coordinates of a starting point of each edge. In the list structure, the edges are sorted in ascending order of X coordinates of the respective edges starting on the same scan line where the respective Y coordinates are identical. The DL 1101 includes the edges E11 and E12. Therefore, in the list structure generated for the DL 1101, the edge E11 starts at the coordinate of X=x11, and the edge E12 subsequently starts at the coordinate of X=x12, on a scan line of Y=y1. The edges E11 and E12 are connected by a link.

To merge the DL generated from the object 820 with the DL 1101, it is determined which one of scan lines maintained in the DL 1101 is used as a scan line to be followed by the merging of the DL generated from the object 820. This determination is performed by, for example, comparing the Y coordinates of the respective scan lines with each other. The Y coordinate of a scan line Y=y2 is larger than the Y coordinate of the scan line Y=y1. Therefore, the scan line Y=y2 to be linked from the scan line Y=y1 is added to the DL 1101. Further, the edges E21 and E22 are added to the added scan line Y=y2, to be linked in the order of the edges E21 and E22. As a result, the DL 1102 is generated.

The conversion processing in step S609 will be described with reference to FIG. 10. Here, the object/DL converting unit 305 generates an edge, a level, and a fill based on the information of the object, which are then merged with an existing DL.

In step S1001, the object/DL converting unit 305 generates a fill from the operand information of the object.

In step S1002, the object/DL converting unit 305 generates a level based on the position of the object in the order in which the objects are generated, and incorporates a link to the fill generated in step S1001, into the generated level.

In step S1003, the object/DL converting unit 305 generates an edge based on the path shape information of the object, and incorporates a link to the level generated in step S1002, into the generated edge.

In step S1004, the object/DL converting unit 305 merges the edge generated in step S1003, with the DL.

The DL generation processing of the present exemplary embodiment is thus performed.

According to the present exemplary embodiment, the processing cost of the combination determination processing in step S604 can be effectively reduced by appropriately switching between the combination stop mode and the combination forward mode. In addition, the processing cost of the spool processing in step S606 and the combination processing in step S607 can be effectively reduced.

First Modification

In the exemplary embodiment described above, step S701 (ROP3 being designated as the ROP information) is described as the condition for determining whether to perform switching from the combination stop mode to the combination forward mode. However, this condition is not limited to this example. For example, the object tendency determining unit 301 may perform switching from the combination mode to the combination forward mode, if an object in which ROP2: XOR is designated as the ROP information (an object with ROP2: XOR being designated) is processed, during the combination stop mode. This is because the combination processing producing a high combination effect can be performed if the subsequent object is an object with ROP2: AND being designated, and the next subsequent object is the object with ROP2: XOR being designated. Specifically, the current object in process and the subsequent two objects can be combined into one object in which ROP2: COPYPEN is designated as the ROP information. The combination mode determining unit 304 may check the ROP information of the subsequent object, and may switch the combination mode back to the combination stop mode, if ROP2: AND is not designated as the ROP information.

Second Modification

In the exemplary embodiment described above, step S701 and step S705 are each described as the condition for performing switching from the combination stop mode to the combination forward mode. However, this condition is not limited to these examples. For example, the combination mode may shift to the combination forward mode, if the number of objects successively processed in the combination stop mode exceeds a predetermined number. FIG. 7B illustrates a flow of this example. The flow in FIG. 7B is implemented by the CPU 101 executing a program stored in the ROM 103, as with FIG. 7A. In this second modification, the flow in FIG. 7B is executed in place of the processing flow in FIG. 7A.

Figure 7A:
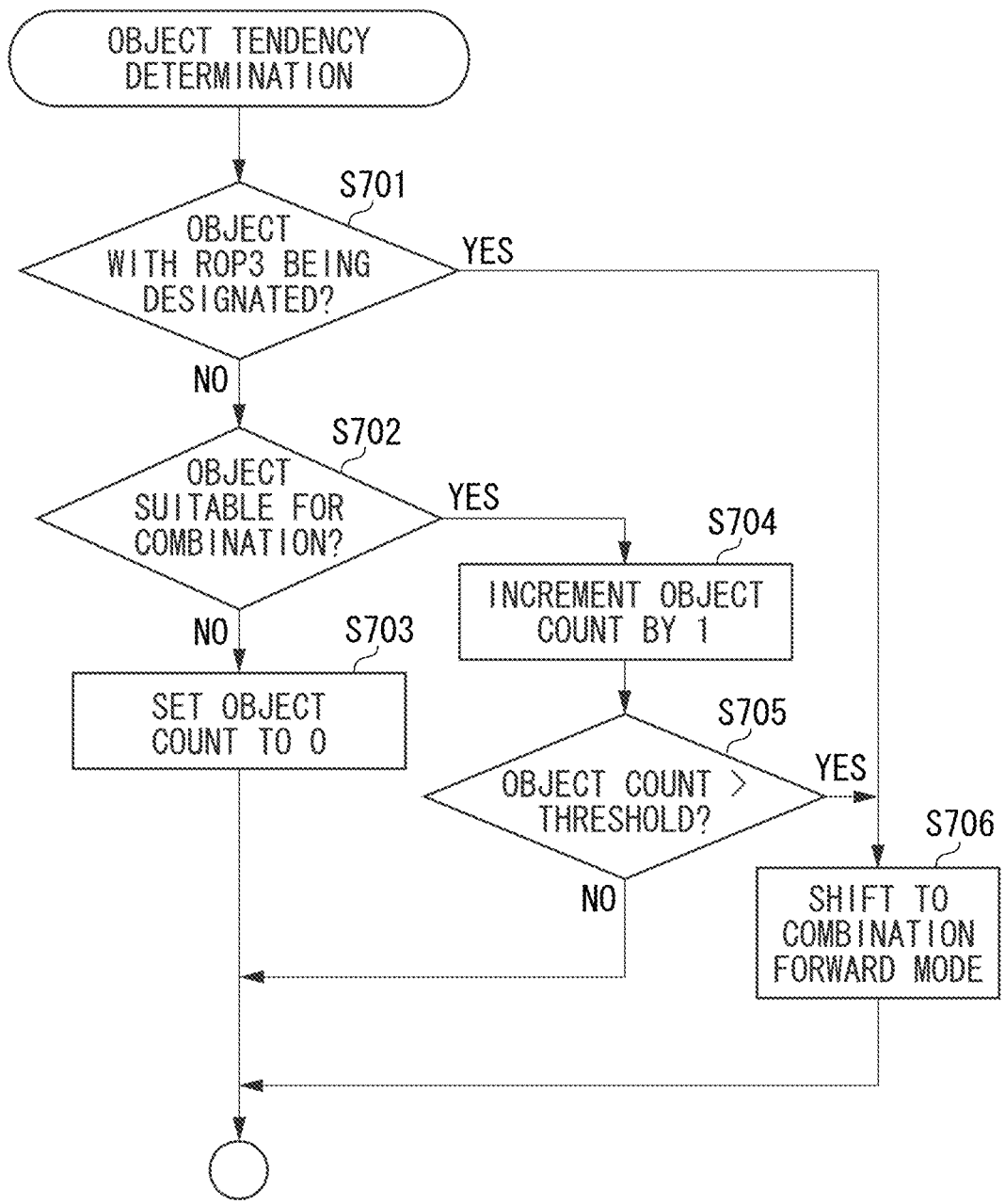
FIGS. 7A, 7B, and 7C are flow charts each illustrating an example of object tendency determination processing according to the present exemplary embodiment.
Figure 7B:
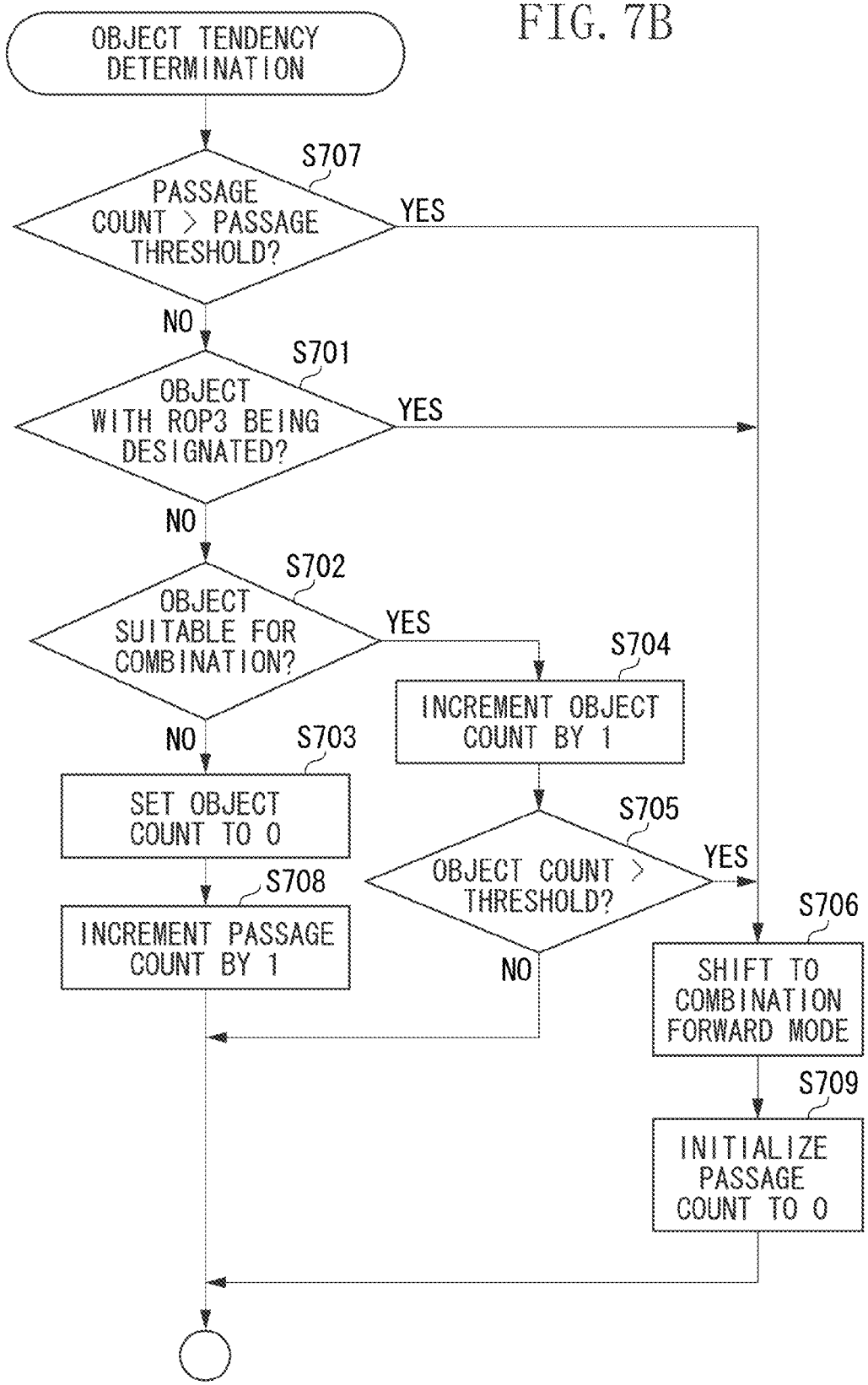

The flow in FIG. 7B is achieved by adding the following processing to the flow in FIG. 7A, and thus is similar to the flow in FIG. 7A, except for the added processing.

The added processing includes (1) processing (step S708 and step S709) of counting the number of objects successively processed in the combination stop mode (a passage count), and (2) processing (step S707) of determining whether the passage count exceeds a predetermined number (a passage threshold).

In step S707, the object tendency determining unit 301 compares the passage count with the passage threshold. In a case where the passage count does not exceed the passage threshold (NO in step S707), the processing proceeds to step S701. Otherwise (YES in step S707), the processing proceeds to step S706. The case where the passage count exceeds the passage threshold is a case where objects, which are neither the objects with ROP3 being designated nor the objects suitable for combination, are successively processed beyond a count corresponding to the passage threshold. In the initial state, the passage count is assumed to be 0.

In step S708, the object tendency determining unit 301 increments the passage count. In other words, the object tendency determining unit 301 counts the number of times each object, which is neither the object with ROP3 being designated nor the object suitable for combination, is processed in succession.

In step S709, the object tendency determining unit 301 initializes the passage count to 0.

Performing the above-described processing allows the following. For example, assume that 100 is set as the passage threshold. In this case, even if successive objects are neither the objects with ROP3 being designated nor the objects suitable for combination, the combination mode is switched from the combination stop mode to the combination forward mode after one hundred objects are processed. In other words, after at least a predetermined number of objects are processed, the combination stop mode is reliably released, so that the combination mode is switched to the combination forward mode.

This second modification is very effective in processing PDL including many objects that may produce a high combination effect, although these objects are not specific objects to be determined in step S701 and step S702.

Figure 7C:
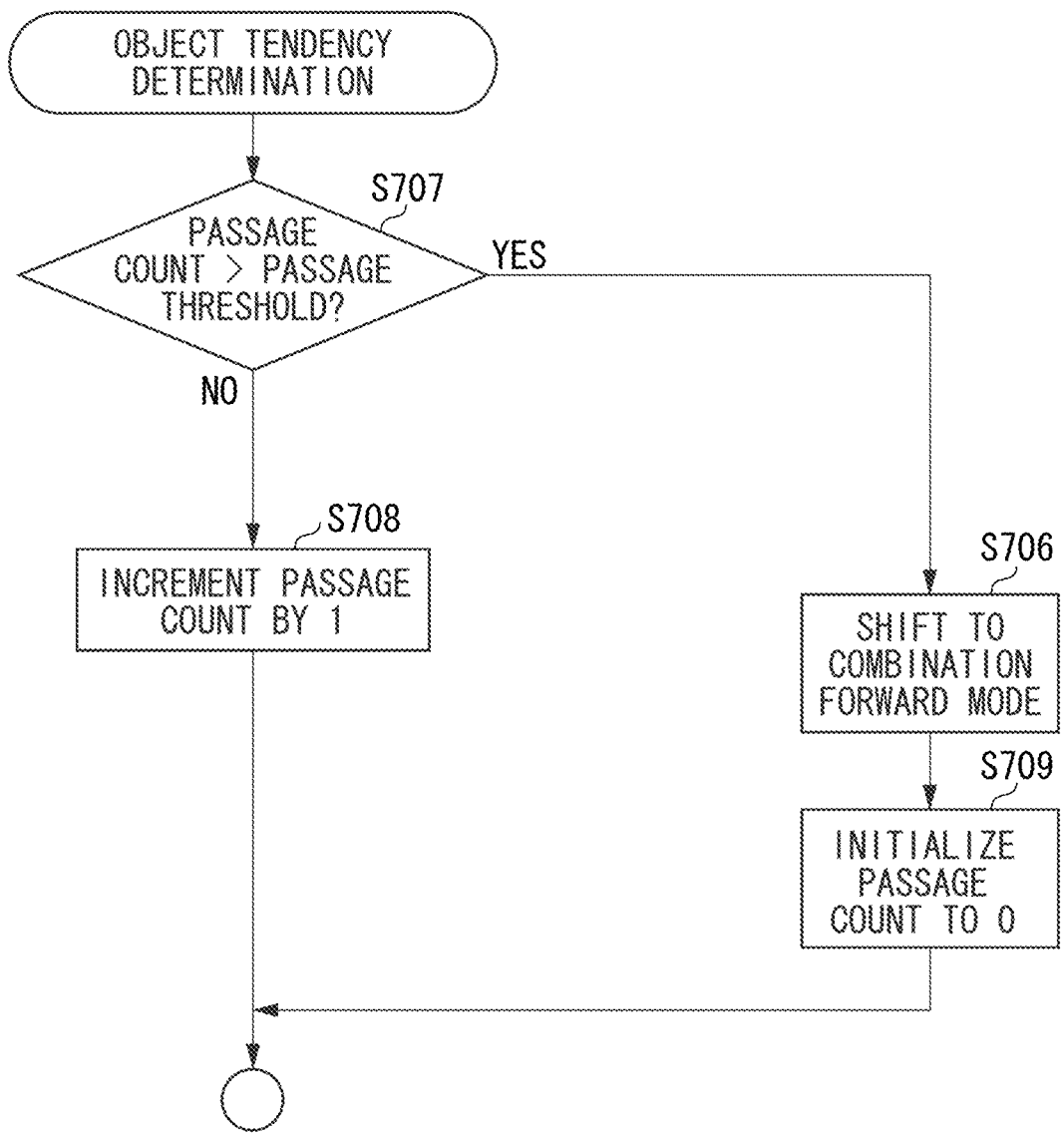

Further, a flow chart illustrated in FIG. 7C, which is achieved by omitting step S701 to step S705 in the flow chart of FIG. 7B, may be executed in place of the flow chart illustrated in FIG. 7B. This flow in FIG. 7C likewise releases the combination stop mode, when at least a predetermined number of objects are successively processed in the combination stop mode.

As described above in the first and second modifications, combining objects expected to produce a low combination effect can be suppressed, by switching the combination modes, based on information of an object, and a relationship between information of an object and information of another object, among successive objects.

Figure 12:
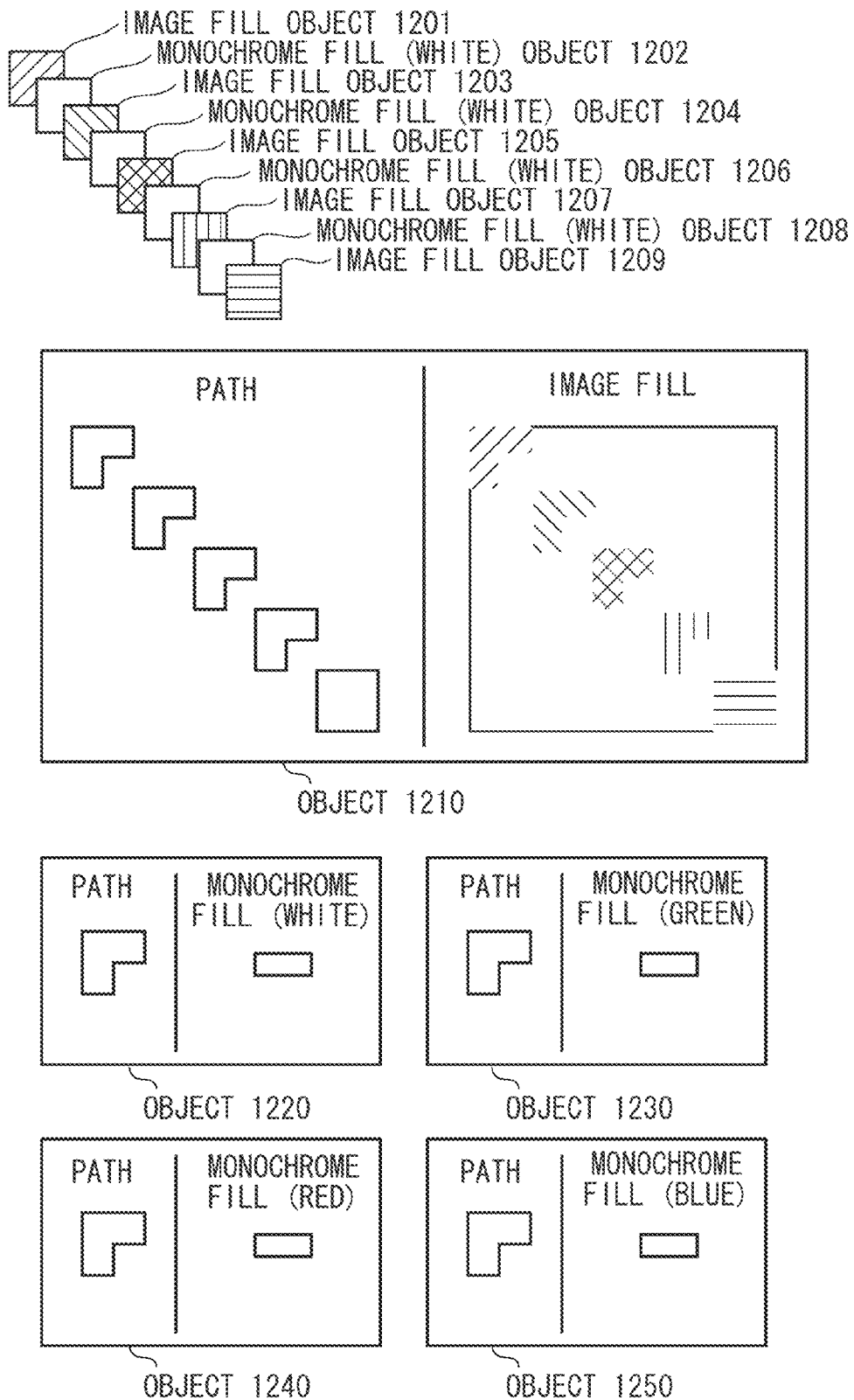
FIG. 12 is a diagram illustrating examples of the received object according to the present exemplary embodiment.

For example, as illustrated in an upper part of FIG. 12, there is a case where successive objects are different in terms of operand information. Objects 1201 to 1209 are this type of objects, and combined into five objects 1210 to 1250, if the combination processing is performed on these objects 1201 to 1209. In other words, the number of output objects is 5 whereas the number of input objects is 9, and therefore, the ratio representing a combination effect is "1.8". This is smaller than the reduction threshold of "2", and demonstrates that the combination effect is low.

In processing of these objects 1201 to 1209, the processing cost of the determination processing in step S604, the spool processing in step S606, and the combination processing in step S607 is a waste.

In the exemplary embodiment as well as the first and second modifications described above, the processing cost for such objects 1201 to 1209 can be effectively reduced.

Other Embodiments

The present inventions are also achievable by such processing that a program implementing one or more functions of the above-described exemplary embodiment is supplied to a system or apparatus via a network or storage medium, and one or more processors in the system or apparatus read the program and then execute the read program. Moreover, the present inventions are also achievable by a circuit (e.g., an application-specific integrated circuit (ASIC)) that implements one or more functions.

According to an embodiment of the present inventions, a DL can be effectively generated, even when an effect of reducing objects by combination is predicted to be low.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-162996, filed Aug. 8, 2014, which is hereby incorporated by reference herein in its entirety.

What is claimed is:

1. An image processing apparatus comprising:
a memory which stores instructions; and
one or more processors which execute the instructions to cause the image processing apparatus to function as:
an acquisition unit configured to acquire one or more objects of page data;
a check unit configured to perform check processing for checking whether to combine an object with another object, for each of a plurality of objects acquired by the acquisition unit;
a determining unit configured to determine, based on a result of the check processing for each of the plurality of objects, whether to perform the check processing for checking whether to combine an object with another object, for an object acquired subsequently to the plurality of objects by the acquisition unit; and
a generating unit configured to generate, based on the determination, intermediate data of the subsequently acquired object without performing the check processing on the subsequently acquired object.

2. The image processing apparatus according to claim 1, wherein the determining unit further determines, based on a result of combination processing, which is performed on objects according to a result of the check processing for each of the plurality of objects, whether to perform the check processing for checking whether to combine an object with another object, for the object acquired subsequently to the plurality of objects by the acquisition unit.

3. The image processing apparatus according to claim 2, wherein the result of the combination processing indicates a reduction degree representing how much the combination processing reduces a number of the plurality of objects on which the combination processing is performed.

4. The image processing apparatus according to claim 3, wherein the determining unit determines to perform the check processing for checking whether to combine an object with another object, for the object acquired subsequently, in a case where the reduction degree exceeds a threshold, and further determines not to perform the check processing for checking whether to combine an object with another object, for the object acquired subsequently, in a case where the reduction degree does not exceed the threshold.

5. The image processing apparatus according to claim 1, wherein the determining unit further operates to make a determination as to whether the object acquired subsequently, which is determined not to be subjected to the check processing for checking whether to combine an object with another object, is a specific type of object, and further determines, based on a result of the determination, whether to perform the check processing for checking whether to combine an object with another object, for the object acquired subsequently.

6. The image processing apparatus according to claim 2, wherein the result of the combination processing is an indicator representing a degree of reducing a number of objects, the indicator being obtained based on a number of the plurality of objects, and based on a number of combined objects that are output as a result of performing the combination processing on the plurality of objects.

7. The image processing apparatus according to claim 6, wherein the indicator representing the degree of reducing the number of objects is a ratio between the number of the plurality of objects and the number of the combined objects.

8. The image processing apparatus according to claim 1, further comprising a printer engine,
wherein a bitmap image of a page is generated by rendering based on at least the generated intermediate data, and
wherein the printer engine is configured to print the page based on the generated bitmap image.

9. An image processing method comprising:
acquiring one or more objects;
performing check processing for checking whether to combine an object with another object, for each of a plurality of acquired objects;
determining, based on a result of the check processing for each of the plurality of acquired objects, whether to perform the check processing for checking whether to combine an object with another object, for an object acquired subsequently to the plurality of acquired objects; and
based on the determination, generating intermediate data of the subsequently acquired object without performing the check processing on the subsequently acquired object.

10. The image processing method according to claim 9, wherein, based on a result of combination processing, which is performed on objects according to a result of the check processing for each of the plurality of acquired objects, it is further determined whether to perform the check processing for checking whether to combine an object with another object, for the object acquired subsequently to the plurality of acquired objects by the acquiring.

11. The image processing method according to claim 10, wherein the result of the combination processing indicates a reduction degree representing how much the combination processing reduces a number of the plurality of acquired objects on which the combination processing is performed.

12. The image processing method according to claim 11, wherein it is determined that the check processing is performed for checking whether to combine an object with another object, for the object acquired subsequently, in a case where the reduction degree exceeds a threshold, and it is further determined that the check processing is not performed for checking whether to combine an object with another object, for the object acquired subsequently, in a case where the reduction degree does not exceed the threshold.

13. The image processing method according to claim 9, wherein it is determined whether the object acquired subsequently, which is determined not to be subjected to the check processing for checking whether to combine an object with another object, is a specific type of object, and it is further determined, based on a result of the determination, whether to perform the check processing for checking whether to combine an object with another object, for the object acquired subsequently.

14. The image processing method according to claim 10, wherein the result of the combination processing is an indicator representing a degree in reduction of a number of objects, the indicator being obtained based on a number of the plurality of acquired objects, and based on a number of combined objects that are output as a result of performing the combination processing on the plurality of acquired objects.

15. The image processing method according to claim 14, wherein the indicator representing the degree in reduction of the number of objects is a ratio between the number of the plurality of acquired objects and the number of the combined objects.

16. The image processing method according to claim 9, further comprising:
generating a bitmap image of a page by rendering based on at least the generated intermediate data; and
printing the page based on the generated bitmap image.

17. A printer comprising:
a memory which stores instructions; and
one or more processors which execute the instructions to cause the printer to function as:
a combining unit configured to perform combining process on a plurality of objects of print data;
a determining unit configured to determine, based on object information before the combining process and object information after the combining process, whether to perform, on an object of the print data different from the plurality of objects, a determining process of determining whether the different object is combined with another object; and
a generating unit configured to generate intermediate data corresponding to the different object without performing the determining process on the different object, based on the determination by the determining unit.

18. The printer according to claim 17,
wherein the generating unit generates the intermediate data corresponding to the different object without performing the determining process on the different object in a case where it is determined by the determining unit that the determining process is not to be performed on the different object; and
wherein, in a case where it is determined by the determining unit that the determining process is to be performed on the different object, the generating unit performs the determining process on the different object and generates the intermediate data corresponding to the different object by processing based on a result of the determining process.

19. The printer according to claim 17,
wherein the object information before the combining process is number of the plurality of objects that are target of the combining process; and the object information after the combining process is number of objects obtained as a result of the combining process.

20. The printer according to claim 17,
wherein the combining process is processing that makes it possible to obtain, from the plurality of objects, some objects number of which is smaller than number of the plurality of objects.

* * * * *